United States Patent Office 2,742,495
Patented Apr. 17, 1956

2,742,495

ESTERIFICATION OF ACONITIC ACID SALTS

Paul Nawiasky, Summit, and Melvin R. Stevinson, Union, N. J., and Jesse Werner, Brooklyn, and Denes L. Deutsch, New York, N. Y., assignors to General Aniline & Film Corporation, New York, N. Y., a corporation of Delaware No Drawing. Application June 29, 1951,
Serial No. 234,438

3 Claims. (Cl. 260—485)

This invention relates to an improved method for the production of esters of organic polycarboxylic acids with aliphatic, cycloaliphatic and aromatic alcohols directly from the salts particularly alkaline earth salts of the corresponding carboxylic acids.

The esters of many organic polycarboxylic acids are of interest as plasticizers, intermediates for the production of surface active agents and the like. Heretofore these esters usually have been produced by direct esterification of the free acids. However, a number of organic polycarboxylic acids are obtained as by products in liming operations and the recovery of the free acids from their salts, particularly the alkaline earth metal salts, in good yield and a high degree of purity is frequently an expensive and difficult step. It is, therefore, an object of this invention to provide a novel and economic process for the production of organic polyesters directly from the salts, particularly the alkaline earth salts of organic carboxylic acids.

By operating in the manner more fully described below the polyesters of organic polycarboxylic acids are obtained in essentially theoretical yield directly from the salts of the corresponding carboxylic acids. The process of the present invention has been found to be applicable and to operate with high yields even when the alkaline earth metal salts of such organic acids as aconitic acid are employed which is known to be relatively unstable on heating and whose decomposition to itaconic acid is known to be promoted by the presence of alkaline earth metal salts during heating.

In practicing the present invention; a salt of an organic carboxylic acid whose ester it is desired to obtain, and more preferably an alkaline earth metal salt of such acid such as the technical calcium or calcium magnesium salts of natural occurring organic carboxylic acids ordinarily obtained as by-products from liming operations, is heated in admixture with the alcohol with which it is desired to esterify the acid in the presence of a sufficient amount of a strong acid to liberate the free organic carboxylic acid and catalyze the esterification. The amount of strong acid, which may advantageously be sulfuric acid (although other strong inorganic acids such as hydrochloric or phosphoric acid or such organic acid as toluene sulfonic acid may be used, if desired), is slightly in excess of the amount required to convert the salt of the organic carboxylic acid being esterified to the free acid. Usually an excess of from 1 to 10 per cent preferably about 5 per cent excess strong acid is employed. This excess functions as a catalyst for the esterification reaction. The water liberated in the esterification reaction is continuously removed during the reaction by azeotropic distillation and to effect such azeotropic distillation there is employed as the azeotropic dehydrating agent either an excess of the alcohol with which it is desired to esterify the organic carboxylic acid or a suitable inert solvent or diluent. A temperature of at least 100° C. is preferably used for the esterification; the temperature employed for esterification should be below that at which the rate of decomposition of the organic carboxylic acid being esterified approaches the rate at which the esterification proceeds. It has been found that during the esterification, the temperature generally should not exceed 140° C. and preferably the temperature maintained during esterification is within the range of 130–135° C. This temperature may advantageously be maintained by employing as the azeotropic dehydrating agent an inert solvent whose vapor pressure is such that the reaction mixture refluxes at the desired temperature or by maintaining such vacuum or pressure on the reaction mixture during the esterification reaction that at the pressure employed the reaction mixture refluxes at the desired temperature.

By operating in the manner briefly outlined above, it has been found that the esterification of organic carboxylic acids proceeds with satisfactory rapidity while decomposition or isomerization of the organic carboxylic acid being esterified is kept at a minimum so that essentially theoretical yields of the desired ester are obtained.

On completion of the esterification, the excess strong acid which was present as the esterification catalyst is preferably neutralized by the addition of mild alkali and the esters are then separated from the inorganic salts formed on acidification of the salt of the organic carboxylic acid, advantageously by filtration; and the solvent used as the azeotropic dehydrating agent, either excess of the alcohol or suitable inert solvent or diluent, removed by distillation at atmospheric, or reduced pressure if necessary to avoid the decomposition of the esters. The esters are thus obtained in substantially theoretical yield and as so obtained are satisfactory for many technical uses. However, the purity of the esters and particularly their color and color of products produced therefrom may be further improved, if desired, by vacuum distillation of the esters or other supplemenal conventional treatments, such as solvent extraction, treatment with adsorbents, etc.

The organic acids whose esters may be produced in accordance with the present invention may be aliphatic or organic polycarboxylic acids and, as stated, in practicing the present invention are used in the form of their salts particularly their alkaline earth salts. As examples of salts of organic carboxylic acids which may be used for the direct production of esters in accordance with this invention, there may be mentioned calcium magnesium aconitate, calcium oxalate, barium oxalate, calcium citrate, sodium citrate, calcium tartrate, calcium succinate, calcium phthalate, potassium phthalate, and corresponding strontium salts, etc. As stated, the salts may advantageously be the technical salts obtained as by-products in liming operations and may comprise, as indicated, the mixed alkaline earth metal salts such as calcium magnesium salts of organic carboxylic acids and the like.

The alcohol with which the organic polycarboxylic acid is esterified in accordance with the present invention may be an aliphatic, cycloaliphatic or aromatic alcohol. The process of the present invention is of particular value for the production of esters of organic polycarboxylic acids with alcohols having only limited solubility in water and as examples of alcohols which may be employed to produce corresponding esters of organic carboxylic esters of organic carboxylic acids may be mentioned n-hexanol, 2-ethyl butanol-1, methyl isobutyl carbinol, n-butanol, isobutanol, amyl alcohols, benzyl alcohol, phenyl ethyl alcohol or cyclohexanol. The amount of alcohol employed in practicing the present invention may be, as indicated, substantially in excess of the amount required for complete esterification of the organic carboxylic acids whose ester it is desired to produce. However, if monoesters of di- or higher carboxylic acids or diesters of tricarboxylic acids, for example, are desired, the correct molar ratio of alcohol to the acid for production of the desired ester will be used. When an excess of the alcohol is employed for the reaction in the production of the complete esters of the organic polycarboxylic acid, the excess alcohol will function as the azeotropic dehydrating agent. However, if it is more advantageous from an economic standpoint, an excess of the alcohol need not be employed but the reaction can be carried out equally effectively in inert solvents, such as toluene, xylene, chlorinated benzene derivatives or aliphatic or cycloaliphatic hydrocarbons, such as cyclohexane, or selected petroleum fractions.

As stated, the strong acid employed to liberate the free organic polycarboxylic acid from its salt, and to catalyze the esterification, may advantageously be sulfuric acid, either concentrated or dilute sulfuric acid having been found to be satisfactory. Other strong non-oxidizing inorganic acids such as phosphoric acid and such organic acids as toluene sulfonic acid have also been employed and are satisfactory; hydrochloric acid is also satisfactory but due to its volatility is less preferred. However, if desired, hydrochloric acid may be employed to liberate the free organic polycarboxylic acid and a small amount of non-volatile acid such as sulfuric acid, phosphoric acid, toluene sulfonic acid, etc., to be added to promote the esterification.

The details of the present invention will be apparent from the following specific examples in which the parts are by weight:

*Example I*

In a reaction vessel, equipped with thermometer, stirrer, and reflux condenser attached to a phase separator for separation of the water from the condensate and return of the organic material to the reaction mixture, there were mixed 630 parts of 2-ethyl butanol and 311 parts of commercial calcium magnesium aconitate (containing 56 per cent aconitic acid as calcium and magnesium salts, ca. 16% calcium, and ca. 3.2 per cent magnesium as calcium magnesium aconitate and ca. 17–18% water). The alcohol and aconitate were thoroughly mixed by stirring for approximately one-half hour at 25–30° C. and there was then added in the course of one hour at 25–30° C. 167 parts of 100 per cent sulfuric acid. The mixture was then heated to reflux (the mixture started to reflux at 104–105° C.) and the temperature rose gradually. During the reflux the condensed water was drawn off as it separated in the phase separator. When the reflux temperature reached 135° C., vacuum was applied and so regulated that the reflux temperature remained at 130–135° C. The mixture was kept at moderate reflux until about 112 parts of water had been separated and no more water distilled off. The vacuum was then released and the mixture allowed to cool to 100° C. The excess sulfuric acid was then neutralized by the addition portionwise of about 26 parts of ammonium sulfite and the temperature maintained at 100° C. until no more SO₂ escaped. A modern vacuum was then applied to assure complete removal of SO₂. The mixture was then cooled to 80° C. and filtered hot. The filter cake was washed with about 300 parts of 2-ethyl butanol until the filtrate was entirely colorless and then sucked dry. The combined filtrate and wash was transferred to vacuum distilling apparatus and the excess alcohol distilled off at a temperature of about 100° C. under vacuum. The vacuum was gradually increased to about 15 mm. and the temperature to about 135° C. and these conditions maintained for one-half hour to insure complete removal of the alcohol. The thus obtained esters were satisfactory for many technical applications, particularly for the production of wetting agents of the type described in U. S. P. 2,315,375 to Nawiasky and Sprenger. However, the esters were further purified by distillation under vacuum, the esters boiling at about 204–205° C. at 2 mm. vacuum. After such distillation 412 parts of tris (2-ethyl butyl) aconitate were obtained, the over-all yield from the calcium magnesium aconitate employed being thus 96.4 per cent of theory.

*Example II*

The procedure described in Example I was repeated except that methyl isobutyl carbinol was employed in place of the 2-ethyl butanol. There was thus obtained tris (methyl amyl) aconitate in high yield. In this case no vacuum was necessary during the esterification since the methyl isobutyl carbinol has a lower boiling point than the isomeric 2-ethyl butanol so that the reflux temperature at atmospheric pressure during the esterification did not exceed 135° C.

*Example III*

The procedure of Example I was repeated except that n-hexanol was employed in place of the isomeric 2-ethyl butanol, other conditions being the same. There was thus obtained tris (hexyl) aconitate in high yield. The ester boiled at 235–248° C. at 2 mm. vacuum.

*Example IV*

The procedure of Example I was repeated except that 456 parts of n-butanol were employed in place of the 630 parts of 2-ethyl butanol and 174 parts of 96 per cent sulfuric acid were employed in place of 167 parts of 100 per cent sulfuric acid. The process was otherwise the same except that the filter cake was washed with n-butanol and no vacuum was necessary during the esterification step since the mixture refluxed at from 115–117° C. and esterification was effected at this temperature to produce tris (butyl) aconitate in high yield.

*Example V*

311 parts of the same commercial calcium magnesium aconitate employed in Example I were treated with 540 parts of mixed amyl alcohols (sold under the trade name Pentasol by Sharples Chemical Company), in the presence of 165 parts 100 per cent sulfuric acid and refluxing the mixture at 135–138° C. until no more water distilled off azeotropically, the procedure being otherwise the same as that described in detail in Example I except that the mixed amyl alcohols were used to wash the filter cake. Tris (amyl) aconitate was thus obtained in a yield of 98.5 per cent of theory.

*Example VI*

In a reaction vessel equipped with thermometer, stirrer and reflux condenser attached to a phase separator for separation of the water from the condensate and return of the organic material to the reaction mixture, there were charged 146 parts of calcium oxalate monohydrate and 415 parts of ethyl butyl alcohol. There were added in one hour, while maintaining the temperature below 135° C. 110 parts of 100 percent sulfuric acid and the mixture was then heated to reflux. Water was removed as it separated in the phase separator and when the reflux temperature reached 135° C. moderate vacuum was applied and regulated so that the mixture refluxed at 130–135° C. until no more water separated in the phase separator. The mixture was allowed to cool to 100° C. and neutralized by the addition portionwise of ammonium sulfite (ca. 40 parts) and kept at 140° C. for two hours, a moderate vacuum being applied at the end to insure complete removal of SO₂. The mixture was cooled to 60° C., filtered, and the calcium sulfate cake washed with ethyl butanol until it was free of esters. The excess alcohol was removed from the filtrate and wash by vacuum distillation. There were thus obtained 232 parts of bis (ethyl butyl) oxalate by vacuum distillation at 127–130° C. at 3 mm. vacuum.

*Example VII*

The reaction vessel employed in Example I was charged with 260 parts of calcium tartrate, 730 parts 2-ethyl butanol, and 90 parts of 100 per cent sulfuric acid. The procedure of Example I was otherwise followed and bis (ethyl butyl) tartrate was obtained in high yield.

*Example VIII*

In the apparatus described in detail in Example I there were charged 210 parts of methyl isobutyl carbinol and 114 parts of calcium citrate tetrahydrate. There were added at below 30° C. 30 parts of 100 percent sulfuric acid and the mixture was heated to reflux. The reflux was continued until no more water separated in the bottom of the phase separator at which point the reflux temperature was about ca. 120–125° C. The mixture was cooled to 100° C. and 9 parts of ammonium sulfite were then added and the temperature kept at 100° C. for two hours, a moderate vacuum being applied at the end to insure complete removal of $SO_2$. The mixture was then cooled to 60 °C. and filtered. The gypsum cake was washed with methyl isobutyl carbinol and the excess of the alcohol removed from the combined filtrate and wash by distillation under vacuum. There was obtained a high yield of bis (methyl amyl) citrate.

*Example IX*

The process described in detail in Example I was repeated except that in the esterification step in place of 630 parts of 2-ethyl butanol, there was employed a mixture of 354 parts of 2-ethyl butanol and 250 parts of xylene. The tris (ethyl butyl) aconitate was obtained in a yield of 98.7 per cent of theory. The other conditions and procedure described in Example I were followed except that no vacuum was needed for the azeotropic distillation of water during the esterification step; and xylene was employed in place of 2-ethyl butanol to wash the filter cake.

*Example X*

The procedure of Example I was repeated except that in place of 630 parts of 2-ethyl butanol in the esterification step, there were employed 350 parts of benzyl alcohol mixed with 350 parts of monochloro benzene, also monochlorobenzene was used to wash the filter cake. In this case, tris (benzyl) aconitate was obtained in high yield. During the esterification step the water was removed by azeotropic distillation as described in Example I, the reflux temperature being kept at 130–135° C. by means of a moderate vacuum as therein described.

*Example XI*

The procedure of Example I was repeated except that in place of 630 parts of 2-ethyl butanol there was employed a mixture of 354 parts of 2-ethyl butanol and 350 parts of dichloro benzene in the esterification step and dichlorobenzene was used to wash the filter cake. There was thus obtained tris (ethyl butyl) aconitate in very high yield.

*Example XII*

In the apparatus employed in Example I there were charged 311 parts of calcium magnesium aconitate, 354 parts of methyl isobutyl carbinol and 350 parts of xylene and 215 parts of sulfuric acid 60° Bé. The procedure described in detail in Example I was followed otherwise (except for using xylene in place of ethyl butanol for washing the filter cake) and there was obtained the triester of aconitic acid with methyl isobutyl carbinol in very high yield.

*Example XIII*

The procedure of Example XII was repeated except that the xylene was replaced with 350 parts of a petroleum fraction consisting of straight and branched chain saturated aliphatic hydrocarbons, boiling at 125–130° C. Tris (methyl amyl) aconitate was thus obtained in high yield.

*Example XIV*

The reaction vessel employed in Example I was charged with 184.2 parts of potassium oxalate and 500 parts of ethyl butyl alcohol. The material was treated as described in detail in Example I, 100 per cent sulfuric acid being employed. A high yield of bis (ethyl butyl) oxalate was obtained.

We claim:

1. The method of producing esters of aconitic acid with alkanols of from 4 to 6 carbon atoms from alkaline earth metal salts of aconitic acid which comprises: heating to reflux a mixture of an alkaline earth metal salt of aconitic acid and an excess of the alcohol with which it is desired to esterify said aconitic acid, together with from 2 to 10% excess of a strong nonvolatile mineral acid, adapted to liberate free aconitic acid from said salt and form water insoluble alkaline earth metal inorganic salts, in the presence of an azeotropic dehydrating agent selected from the group consisting of an excess of the alcohol employed for the esterification and inert water insoluble organic solvents, controlling the pressure on said reaction mixture to cause the same to reflux at about 135° C., removing water formed during the esterification by azeotropic distillation, neutralizing the reaction mixture on completion of the esterification when water is no longer distilled off, removing insoluble inorganic salts from said reaction mixture and recovering the desired aconitic acid esters by vacuum distillation.

2. The method as defined in claim 1 wherein the mineral acid specified is sulfuric acid.

3. The method as defined in claim 2 wherein the neutralization step specified is effected by adding ammonium sulfite to the reaction mixture.

References Cited in the file of this patent

UNITED STATES PATENTS

| | | |
|---|---|---|
| 2,290,926 | Weisberger et al. | July 28, 1942 |
| 2,359,537 | Ventre | Oct. 3, 1944 |
| 2,390,140 | Weisberger et al. | Dec. 4, 1945 |
| 2,406,648 | Weisberger et al. | Aug. 27, 1946 |
| 2,448,506 | Ambler | Sept. 7, 1948 |
| 2,475,629 | Meincke | July 12, 1949 |
| 2,645,658 | Reeves | July 14, 1953 |

FOREIGN PATENTS

| | | |
|---|---|---|
| 171,835 | Germany | June 25, 1906 |
| 415,472 | Great Britain | Aug. 27, 1934 |